Patented Oct. 10, 1939

2,175,916

UNITED STATES PATENT OFFICE 2,175,916

COMPOSITE BODY

Hans Pulfrich, Berlin-Friedenau, Germany, assignor to General Electric Company, a corporation of New York No Drawing. Application September 16, 1937, Serial No. 164,189. In Germany January 9, 1937

5 Claims. (Cl. 49—92)

The present invention relates to a composite body suitable for use in the manufacture of electrical discharge devices and is particularly concerned with a new ceramic material.

A number of conditions must be satisfied in gas impervious ceramic bodies that are to be sealed to other materials, such as soft glass, and which are to be used in making, for example, electrical discharge bulbs or lamps. In the first place it is obvious that such bodies should have as nearly as possible the same thermal expansion as the glass or other material to which they are sealed, and that the equality of the thermal expansion should cover the entire temperature range which must be considered for the manufacture and for the operation of articles such, for example, as discharge bulbs or lamps. It is further necessary for the purpose of obtaining a good, permanent seal between the ceramic body and the glass that the ceramic material be one which has a high resistance to fluctuating temperatures. The dielectric losses and the dielectric constants must be as small as possible. Finally it is desirable that at approximately 1400° C. the ceramic body form a sintered mass which is impervious to gases and that a large temperature range lie between the sintering temperature and the melting temperature.

It is an object of the present invention to provide a ceramic material which meets the above-stated requirements for ceramics to be sealed to vitreous materials, such as soft glass.

Another object of this invention is to provide a composite body comprising glass such as soft glass and a vacuum-tight ceramic body adapted to be sealed or fusion-welded thereto and to form a vacuum-tight weld or joint therewith.

The stated objects are attained in accordance with the present invention by a ceramic body which consists of the product of sintering together the following components within the approximate range of proportions stated:

| | Parts by weight |
|---|---|
| Magnesium oxide | 65 to 80 |
| Beryllium oxide | 35 to 20 |
| Titanium dioxide | 0.5 to 2 |

A more specific example of components and ranges of proportions thereof that may be used with particular advantage in preparing a product of this invention follows:

| | Parts by weight |
|---|---|
| Magnesium oxide | 70 to 75 |
| Beryllium oxide | 30 to 25 |
| Titanium dioxide | Approximately 1 |

The components are wet or dry milled to form a uniform mixture, which is molded to the desired shape. The molded mass is fired at a temperature of approximately 1400° C. thereby to produce a gas or vacuum-tight ceramic body; that is to say, a body which is practically impervious to passage therethrough of gases. Since the sintered mass does not melt completely until temperatures above 1800° C. are reached, a wide sintering range is available for their preparation. It is therefore possible to prepare even difficult shapes in a favorable manner.

The main component of the ceramic bodies of this invention is magnesium oxide. Apparently the addition of beryllium oxide has the effect of increasing the thermal conductivity and consequently the resistance to temperature changes. The small amount of titanium dioxide is sufficient to make the body vacuum-tight. However, because of the small amount of titanium dioxide which is used it has almost no influence whatsoever on the electrical properties of the ceramic body. The dielectric losses of the ceramic materials of this invention are approximately 1 or less and the dielectric constant is approximately 6 to 8. It is particularly to be noted that the small amount of titanium dioxide is sufficient for making the magnesium oxide bodies vacuum-tight and that the addition of approximately 25 per cent beryllium oxide to the magnesium oxide body reduces the coefficient of linear thermal expansion from $130 \times 10^{-7}$ per degree centigrade to the coefficient of linear thermal expansion of soft glass or approximately $90 \times 10^{-7}$ per degree centigrade.

The high thermal conductivity of ceramic materials of this invention makes it possible to seal them to glass (for example, soft glass), or by means of glass to metal, even with an oxygen burner. A suitable glass for sealing to the new ceramic bodies is, for instance, the so-called "M" glass. This glass consists of approximately 56 parts silicon dioxide, approximately 12 parts of sodium oxide and potassium oxide, approximately 32 parts of lead oxide and a small amount, for example approximately 1 part, of aluminum oxide. The seal or joint between the ceramic body and the glass is vacuum-tight.

What I claim as new and desire to secure by Letters Patent of the United States is:

1. A composite body comprising a metallic member, a glass bonded to said metallic member, and fusion-welded to said glass a ceramic material consisting of the product of firing at an elevated temperature a mixture consisting of, by weight, from about 65 to 80 parts magnesium oxide, about 35 to 20 parts beryllium oxide, and not substantially exceeding 2 parts titanium dioxide.

2. A composite body comprising a glass member and a member composed of a ceramic material consisting of the product of firing at an elevated temperature a mixture consisting of, by weight, from about 70 to 75 parts magnesium oxide, about 30 to 25 parts beryllium oxide and approximately 1 part titanium dioxide.

3. In a composite body a ceramic material consisting of the product of firing at an elevated temperature a mixture consisting of, by weight, from about 65 to 80 parts magnesium oxide, about 35 to 20 parts beryllium oxide, and not substantially exceeding 2 parts titanium dioxide.

4. In a composite body a ceramic material consisting of the product of firing at an elevated temperature a mixture consisting, by weight, of from about 70 to 75 parts magnesium oxide, about 30 to 25 parts beryllium oxide and approximately 1 part titanium dioxide.

5. A composite body comprising a metallic member, a glass bonded to said metallic member, said glass being composed of approximately 56 parts silicon dioxide, approximately 12 parts sodium oxide and potassium oxide, approximately 32 parts lead oxide and approximately 1 part aluminum oxide, and fusion-welded to said glass a ceramic material consisting of the product of firing at an elevated temperature a mixture consisting, by weight, of about 65 to 80 parts magnesium oxide, about 35 to 20 parts beryllium oxide, and approximately 0.5 to 2 parts titanium dioxide.

HANS PULFRICH.